(12) United States Patent
Miyazaki (10) Patent No.: US 10,638,042 B2
(45) Date of Patent: Apr. 28, 2020

(54) ELECTRONIC DEVICE, CONTROL DEVICE FOR CONTROLLING ELECTRONIC DEVICE, CONTROL PROGRAM, AND CONTROL METHOD

(71) Applicant: SHARP KABUSHIKI KAISHA, Sakai, Osaka (JP)

(72) Inventor: Daishi Miyazaki, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/416,705

(22) Filed: May 20, 2019

(65) Prior Publication Data

US 2019/0356852 A1    Nov. 21, 2019

(30) Foreign Application Priority Data

May 21, 2018  (JP) ................................ 2018-097245

(51) Int. Cl.
| | |
|---|---|
| *H04N 5/232* | (2006.01) |
| *H04N 5/225* | (2006.01) |
| *H04N 13/00* | (2018.01) |
| *H04N 13/239* | (2018.01) |
| *H04N 13/243* | (2018.01) |
| *G02B 3/12* | (2006.01) |
| *G02B 7/28* | (2006.01) |
| *G03B 13/20* | (2006.01) |

(52) U.S. Cl.
CPC ....... *H04N 5/23245* (2013.01); *H04N 5/2258* (2013.01); *H04N 5/232121* (2018.08)

(58) Field of Classification Search
CPC ......... H04N 5/23245; H04N 5/232121; H04N 5/2258; H04N 5/23203; H04N 13/005; H04N 13/239; H04N 13/243; H04N 5/23293; G02B 3/12; G02B 7/285; G03B 13/20

USPC ...... 348/345, 207.11, 207.99, 211.99, 211.3, 348/211.4, 211.8, 211.11, 42, 47, 208.12, 348/326; 359/319, 383; 396/141

See application file for complete search history.

(56) References Cited

U.S. PATENT DOCUMENTS

| | | | | |
|---|---|---|---|---|
| 6,744,982 | B2* | 6/2004 | Nonaka | G03B 3/10 |
| | | | | 396/121 |
| 2003/0052991 | A1* | 3/2003 | Stavely | H04N 5/232 |
| | | | | 348/370 |
| 2008/0030592 | A1* | 2/2008 | Border | H04N 5/50 |
| | | | | 348/218.1 |

(Continued)

FOREIGN PATENT DOCUMENTS

JP      2003-101853 A     4/2003

*Primary Examiner* — Marly S Camargo
(74) *Attorney, Agent, or Firm* — ScienBiziP, P.C.

(57) ABSTRACT

The present invention performs stable image capturing and prevents blurring. A control device (3) is configured to control an electronic device (10) including: an autofocus camera (1) having an auto-focus function; and a fixed-focus camera (2) having a fixed focal point, the control device including: a distance identifying section (31) configured to identify an image capturing distance between a subject and the electronic device (10); and an image capturing device determining section (32) configured to determine, according to the image capturing distance identified, which one of the autofocus camera (1) and the fixed-focus camera (2) is to be used for image capturing.

7 Claims, 6 Drawing Sheets

(56) References Cited

U.S. PATENT DOCUMENTS

| | | | |
|---|---|---|---|
| 2008/0218613 A1* | 9/2008 | Janson | H04N 9/09 348/262 |
| 2010/0265346 A1* | 10/2010 | Iizuka | H04N 5/225 348/218.1 |
| 2017/0054967 A1* | 2/2017 | Zhang | G02B 3/12 396/141 |

* cited by examiner

ELECTRONIC DEVICE, CONTROL DEVICE FOR CONTROLLING ELECTRONIC DEVICE, CONTROL PROGRAM, AND CONTROL METHOD

This Nonprovisional application claims priority under 35 U.S.C. § 119 on Patent Application No. 2018-097245 filed in Japan on May 21, 2018, the entire contents of which are hereby incorporated by reference.

TECHNICAL FIELD

The present invention relates to (i) an electronic device, (ii) a control device for controlling an electronic device, (iii) a control program, and (iv) a control method.

BACKGROUND ART

Patent Literature 1 discloses a digital camera. According to the digital camera, Auto Focus (AF) image capturing and fixed-focus image capturing not performing AF are properly used apart from each other so that AF image capturing is minimized. This leads to a reduction in release time lag, and therefore allows for comfortable image capturing. According to the digital camera, the fixed-focus image capturing and the AF image capturing are used apart from each other by use of an image-capturing focal length.

CITATION LIST

Patent Literature

[Patent Literature 1]
Japanese Patent Application Publication, Tokukai, No. 2003-101853 (Publication Date: Apr. 4, 2003)

SUMMARY OF INVENTION

Technical Problem

According to the digital camera using the conventional technique, a lens is fixed during fixed-focus image capturing. However, it is difficult to completely fix the lens, so that a position of the lens unfortunately shifts due to the vibration or the like of the digital camera. This is because fixed-focus image capturing is performed with use of an autofocus camera.

In addition, because the lens is affected by the gravity, the position of the lens is unfortunately changed by the orientation of the digital camera (i.e., whether the digital camera is oriented upwardly, horizontally, or downwardly). Therefore, stable image capturing is unfortunately difficult according to the digital camera using the conventional technique. In addition, according to the conventional technique, blurring may unfortunately occur in a case where an image of a subject in a short distance is captured (i.e., in a case where the subject is within a distance of less than 1.2 m). However, no measures are taken to address the concern.

An aspect of the present invention has been made in view of the above problem, and an object of an aspect of the present invention is to achieve an electronic device or the like which is capable of performing stable image capturing and preventing blurring.

Solution to Problem

In order to attain the object, an electronic device in accordance with an aspect of the present invention includes: at least one first image capturing device having an autofocus function; at least one second image capturing device having a fixed focal point; and at least one control device, the at least one control device being configured to perform (a) a process of identifying an image capturing distance between a subject and the electronic device and (b) a process of determining, according to the image capturing distance identified, which one of the at least one first image capturing device and the at least one second image capturing device is to be used for image capturing.

In order to attain the object, an electronic device controlling device in accordance with an aspect of the present invention is a control device configured to control an electronic device, the electronic device including: at least one first image capturing device having an auto-focus function; and at least one second image capturing device having a fixed focal point, the control device including: a distance identifying section configured to identify an image capturing distance between a subject and the electronic device; and an image capturing device determining section configured to determine, according to the image capturing distance identified, which one of the at least one first image capturing device and the at least one second image capturing device is to be used for image capturing.

Advantageous Effects of Invention

With an aspect of the present invention, it is advantageously possible to perform stable image capturing and prevent blurring.

BRIEF DESCRIPTION OF DRAWINGS

(a) of FIG. 2 is a view schematically illustrating an appearance of a side of the electronic device, which side faces a display device (i.e., a front side). (b) of FIG. 2 is a view schematically illustrating an appearance of a back side of the electronic device.

DESCRIPTION OF EMBODIMENTS

<<Main Configuration of Electronic Device>>

Figure 1:
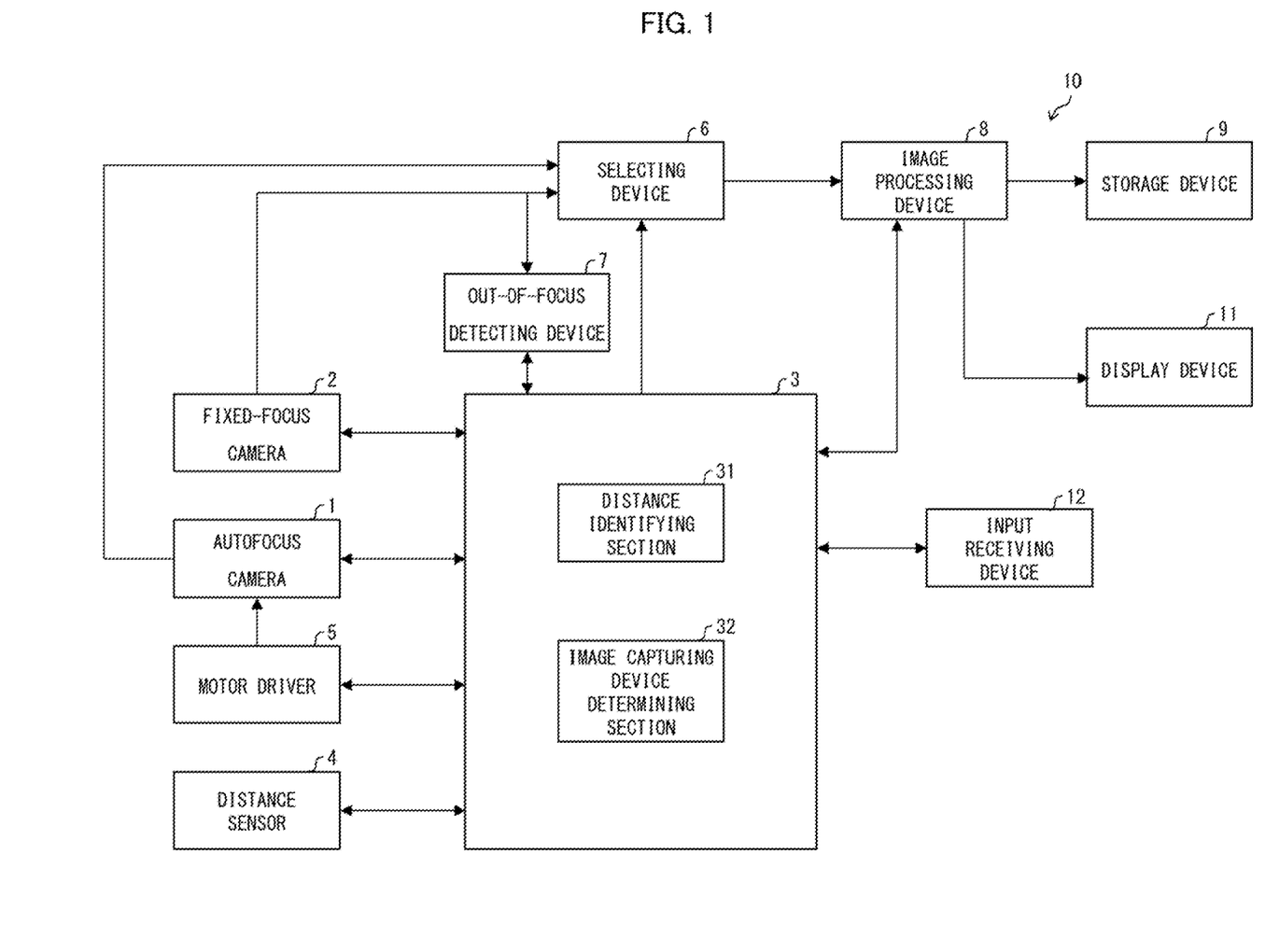
FIG. 1 is a block diagram illustrating a main configuration of an electronic device in accordance with an embodiment of the present invention.

As illustrated in FIG. 1, an electronic device 10 in accordance with an embodiment of the present invention includes an autofocus camera (first image capturing device) 1, a fixed-focus camera (second image capturing device) 2, a control device 3, a distance sensor (distance measuring sensor) 4, a motor driver 5, a selecting device 6, an out-of-focus detecting device 7, an image processing device 8, a storage device 9, a display device 11, and an input receiving device 12.

The present embodiment will discuss an example in which one autofocus camera 1, one fixed-focus camera 2, and one control device 3 are provided. Note, however, that a plurality of autofocus cameras 1, a plurality of fixed-focus cameras 2, and/or a plurality of control devices 3 can be provided. The following description will assume that the electronic device 10 is a smartphone. However, the present invention is not limited to such a configuration. Any electronic device can be employed, provided that at least two cameras (image capturing devices), i.e., the autofocus camera 1 and the fixed-focus camera 2, are provided. For example, the electronic device can be a digital camera.

The autofocus camera 1 is a camera having a so-called auto-focus function. That is, the autofocus camera 1 has a function of adjusting the focus with respect to a subject by changing the position of a lens with respect to an image capturing element. That is, by moving the lens, the autofocus camera 1 can adjust the focus at any distance from a long distance to a short distance.

However, according to the autofocus camera 1, a captured image is affected by a movement of the lens because the autofocus camera 1 operates to adjust the focus constantly. In addition, it is generally difficult to completely fix the position of a lens, so that the position of the lens shifts due to the effects of an orientation difference (gravity) and vibration. Therefore, even in a case where fixed-focus image capturing is intended with use of the autofocus camera 1 as in the case of the conventional technique, the effect of the movement of the lens remains.

The autofocus camera 1 also includes an AF drive mechanism which automatically performs focus adjustment with use of a mechanism (actuator) which moves the lens. Examples of the AF drive mechanism encompass a Voice Coil Motor (VCM). The operation of the drive mechanism is controlled by the motor driver 5.

The fixed-focus camera 2 is a camera in which the position of a lens relative to an image capturing element is fixed. That is, unlike the autofocus camera 1, the fixed-focus camera 2 includes no drive mechanism such as a motor for adjusting the position of the lens. Therefore, in the fixed-focus camera 2, there is no vibration due to the driving of the drive mechanism. Since the lens is completely fixed with use of the fixed-focus camera 2, a captured image is not affected by the lens move. This makes it possible to perform stable image capturing. Meanwhile, according to the fixed-focus camera 2, a range in which a subject can be in focus is limited. The subject therefore cannot be in focus outside the range.

Figure 2:
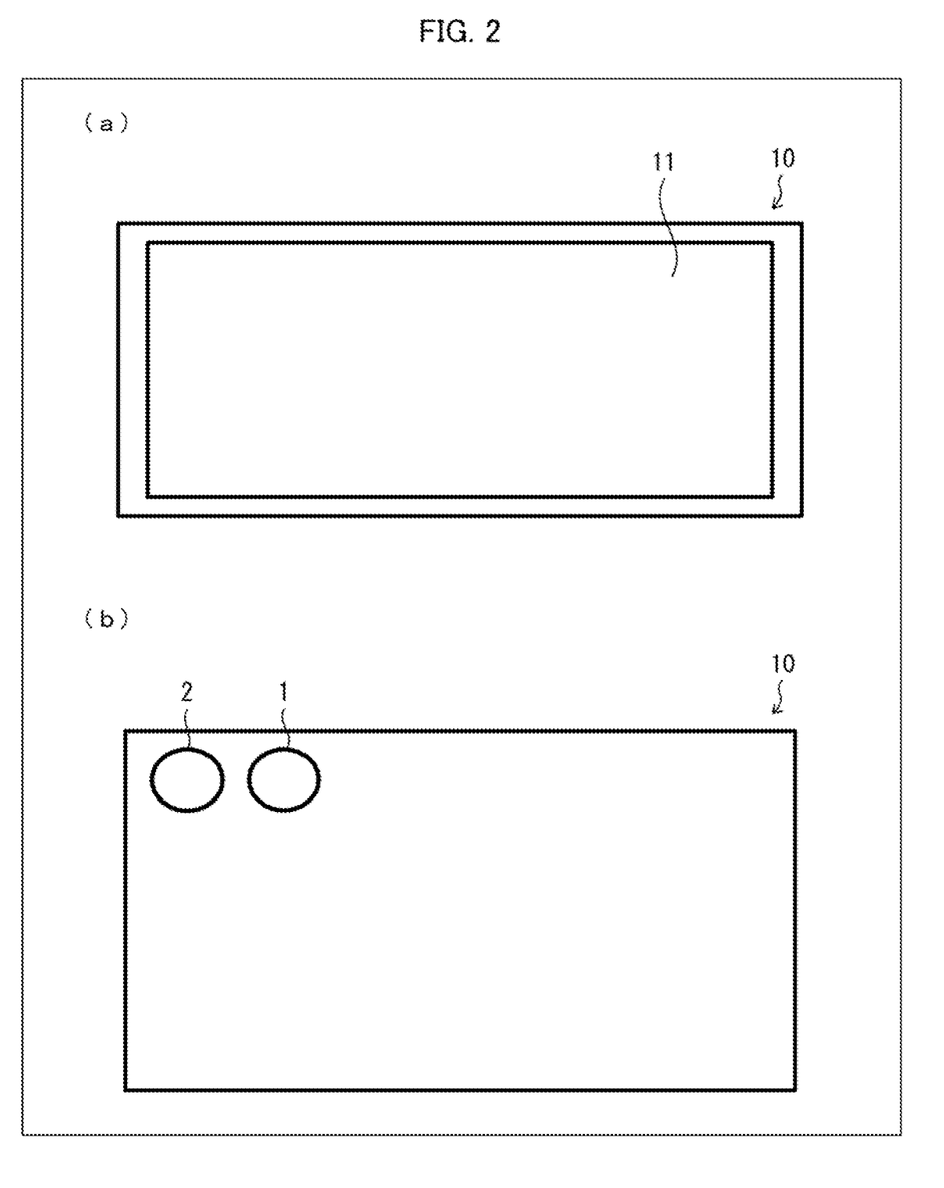

(a) of FIG. 2 illustrates an appearance of a side of the electronic device 10, which side faces the display device 11 (i.e., front side). (b) of FIG. 2 illustrates an appearance of a back side of the electronic device 10. As illustrated in (b) of FIG. 2, the autofocus camera 1 and the fixed-focus camera 2 are both provided on the back side (a shared side) of the electronic device 10.

Although a focus adjustment position (point of focus) of the fixed-focus camera 2 is optional, the focus adjustment position can be set at, for example, a hyperfocal length so that a subject can be in focus in a wide range. A relationship between a point of focus and a hyperfocal length of fixed-focus camera 2 will be described with reference to FIG. 3.

Figure 3:
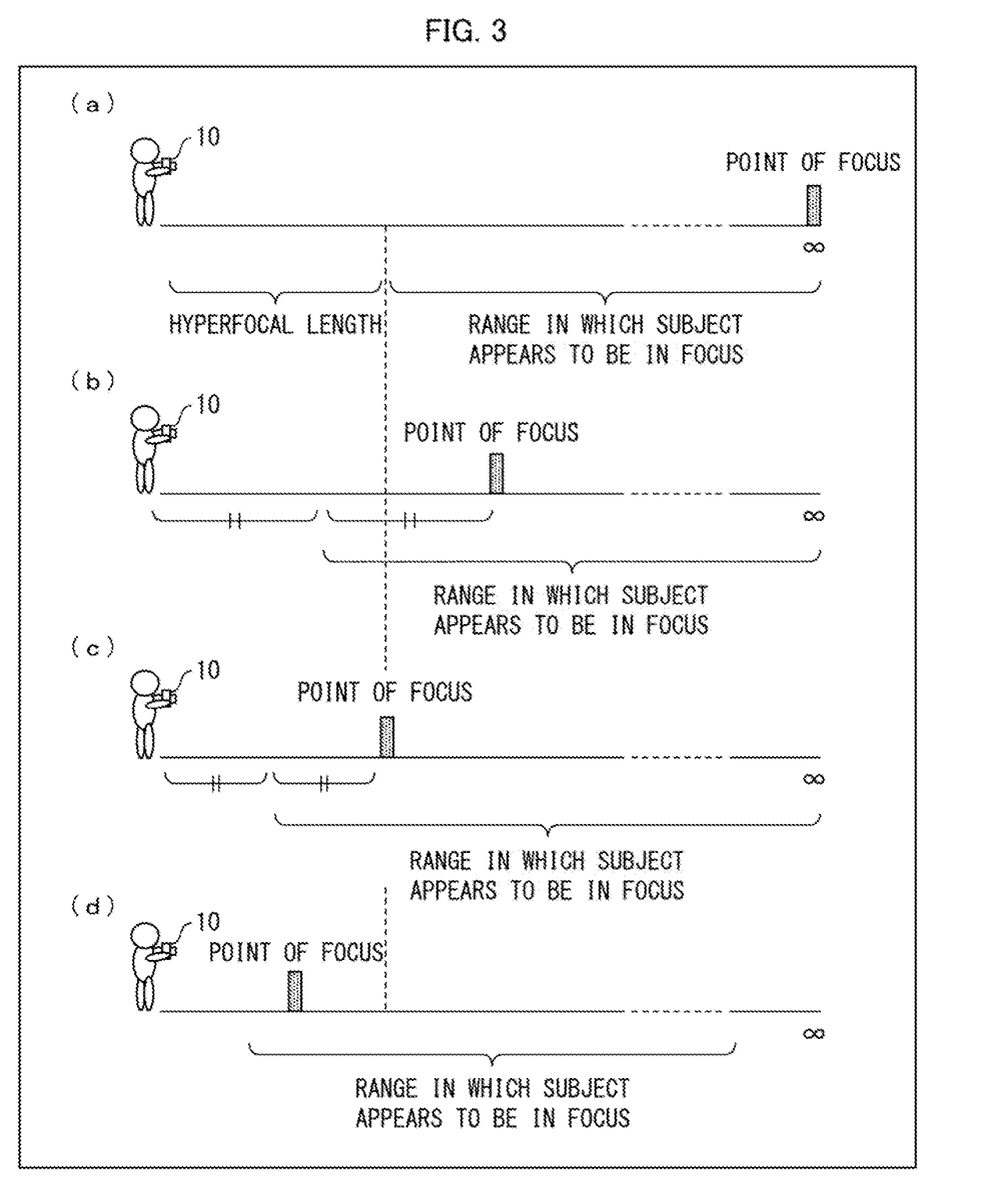
FIG. 3 is an explanatory view schematically illustrating a relationship between a point of focus and a hyperfocal length of a fixed-focus camera.

In a case where the point of focus of the fixed-focus camera 2 is adjusted to infinity ((a) of FIG. 3), a subject within a user's reach does not necessarily become in focus, irrespective of how much a diaphragm is closed. In this case, a distance between the position of the electronic device 10 and a range in which a subject appears to be in focus is referred to as a hyperfocal length. A subject closer to the camera than where the hyperfocal length lies becomes blurred. In a case where there is nothing in the range of the hyperfocal length, a deep focus (a state in which all of subjects are in focus) is obtained without any issues. However, in a case where there is a subject located closer to the camera than where the hyperfocal length lies, strictly speaking, the subject becomes blurred.

In a case where the point of focus is moved closer from infinity ((b) of FIG. 3), and the depth of field can be slightly expanded toward the camera while the infinity is still included in the depth of field. In this case, a distance between the camera and a camera-side end of the range in which a subject appears to be in focus is half of a distance between the camera and the point of focus. In a case where the point of focus is brought closer to the hyperfocal length ((c) of FIG. 3), the depth of field toward the camera can be maximized while a subject up to the infinity is still in focus.

In a case where the point of focus is moved even closer to the camera ((d) of FIG. 3), the infinity is no longer in focus. This means that the range in which a subject appears to be in focus is maximized in a case where the point of focus is set to the position at the hyperfocal length. That is, a distance from the fixed-focus camera 2 (or the electronic device 10) to point of focus is preferably set to the hyperfocal length. This makes it possible to maximize a range in which it is possible to prevent blurring which occurs when image capturing is performed with use of the fixed-focus camera 2.

However, a subject closer to the camera than a point at a half of the hyperfocal length is not in focus. Therefore, in a case where a subject in this range is to be captured, the camera can be switched to the autofocus camera 1. This allows any subject in any image capturing distance to be in focus. Alternatively, it is possible to (i) set the point of focus of the fixed-focus camera 2 to a point closer to the camera and (ii) cover a far distance with use of the autofocus camera 1.

Whether or not focusing is achieved (i.e., whether or not a subject can be in focus) by the fixed-focus camera 2 can be determined by criteria as described in the following examples. For example, a value indicating the degree to which the focus is shifting and which is detected by the out-of-focus detecting device 7 is compared with a certain threshold. In a case where the value indicating the degree to which the focus is shifting exceeds the threshold, it is determined that a subject is not in focus by the adjustment by the fixed-focus camera 2.

Alternatively, it is possible to (i) back calculate an image capturing distance from an input signal supplied to the motor driver 5 for causing the autofocus camera 1 to perform AF and (ii) compares the image capturing distance with a focal range of the fixed-focus camera 2. Alternatively, it is possible to compare, with the focal range of the fixed-focus camera 2, an image capturing distance which is obtained from the distance sensor 4.

The electronic device 10 in accordance with the present embodiment includes two cameras, the autofocus camera 1 and the fixed-focus camera 2, and properly switches between the cameras to be used for image capturing. Image capturing is basically performed by the fixed-focus camera 2. In a case where a subject cannot be in focus with use of the fixed-focus camera 2, the camera is switched to the autofocus camera 1 to continue image capturing. It is also possible to switch to the fixed-focus camera 2 in a case where a subject moves during image capturing with the autofocus camera 1 so that the subject can be in focus with use of the fixed-focus camera 2.

That is, with the electronic device 10 in accordance with the present embodiment, it is possible, without blurring, to continue image capturing by (i) basically using the fixed-focus camera 2 for the image capturing so as to perform stable image capturing and (ii) automatically switching to the autofocus camera 1 as necessary according to a movement of the subject.

The control device 3 centrally controls the constituent elements of the electronic device 10, and is configured by, for example, a central processing unit (CPU). As illustrated in FIG. 1, the control device 3 includes a distance identifying section 31 and an image capturing device determining section 32.

The distance identifying section 31 identifies an image capturing distance between a subject and the electronic device 10. For example, the distance identifying section 31 can (i) monitor the position of a lens of the autofocus camera 1 via the motor driver 5 and (ii) back calculate (identify) the image capturing distance from information on the position. For example, the distance identifying section 31 identifies the image capturing distance by use of information on a position of the lens of the autofocus camera 1 when the autofocus camera 1 has a focus on a subject.

In a case where a path of light, which enters an image capturing element from the lens of the fixed-focus camera 2, is pupil-divided into a first path and a second path (two paths), the distance identifying section 31 can identify the image capturing distance by use of an amount by which the following positions of the image capturing element are shifted from each other: (i) a position onto which a subject is imaged by light in the first path and (ii) a position onto which the subject is imaged by light in the second path.

Figure 4:
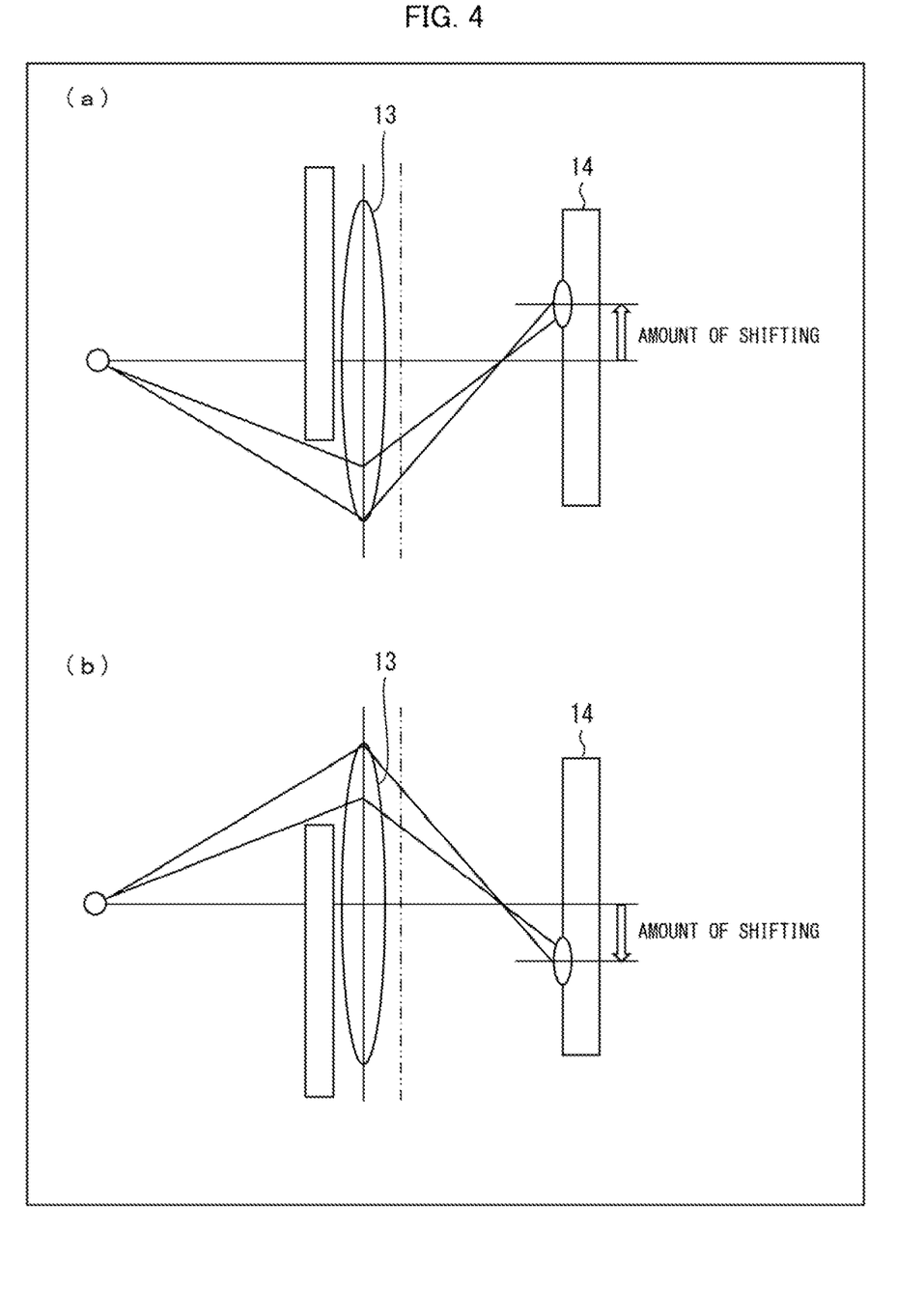
FIG. 4 is a view for explaining the principle of a pupil-division phase method.

For example, between two paths into which a path of light is pupil-divided as illustrated in (a) and (b) of FIG. 4, there occurs shifting of a position of an image capturing element 14 onto which position a subject is imaged via a lens 13, an amount of the shifting varying according to an image capturing distance between the subject and the electronic device 20. Therefore, an image capturing distance can be identified by utilizing an amount by which the following positions of the image capturing element 14 are shifted from each other: (i) a position onto which a subject is imaged by light in the first path and (ii) a position onto which the subject is imaged by light in the second path.

Alternatively, the distance identifying section 31 can directly identify an image capturing distance between the subject and the electronic device 10 by use of a result of detection by the distance sensor (distance measuring sensor) 4. Although the electronic device 10 includes one distance sensor 4 in the present embodiment, the electronic device 10 can include a plurality of distance sensors 4.

Then, according to the image capturing distance thus identified, the image capturing device determining section 32 determines which device of the autofocus camera 1 and the fixed-focus camera 2 is to be used for image capturing. According to the image capturing device determined by the image capturing device determining section 32, the selecting device 6 selects the image capturing device to be operated (i.e., switches between the autofocus camera 1 and the fixed-focus camera 2).

The image processing device 8 subject, to image processing, a captured image captured by the autofocus camera 1 or the fixed-focus camera 2. Then, the image processing device 8 stores, in the storage device 9, image data obtained through the image processing performed by the image processing device 8. In addition, the image processing device 8 causes the display device 11 to display a preview image of the captured image captured by the autofocus camera 1 or the fixed-focus camera 2. The input receiving device 12 receives an instruction by an input operation of a user, and then, based on the instruction, causes the electronic device 10 to execute an operation corresponding to the instruction.

According to the above configuration, the fixed-focus camera 2 is an image capturing device having a fixed focal point so that the lens of the fixed-focus camera 2 is completely fixed. Therefore, in a case where image capturing is performed with use of the fixed-focus camera 2, stable image capturing can be performed without an effect of a movement of the lens.

Note that since the fixed-focus camera 2 has the fixed focal point, a range in which a subject can be in focus is limited. Therefore, the subject may become out of focus so as to result in blurring outside the range. According to the configuration, however, which device of the autofocus camera 1 and the fixed-focus camera 2 is to be used for image capturing is determined according to an image capturing distance. Therefore, in a case where there is a possibility that blurring can occur as a result of image capturing with use of the fixed-focus camera 2, blurring can be prevented by switching the image capturing device to the autofocus camera 1 having the auto-focus function. This makes it possible to perform stable image capturing and to prevent blurring.

<<Operation Example 1 of Electronic Device>>

Figure 5:
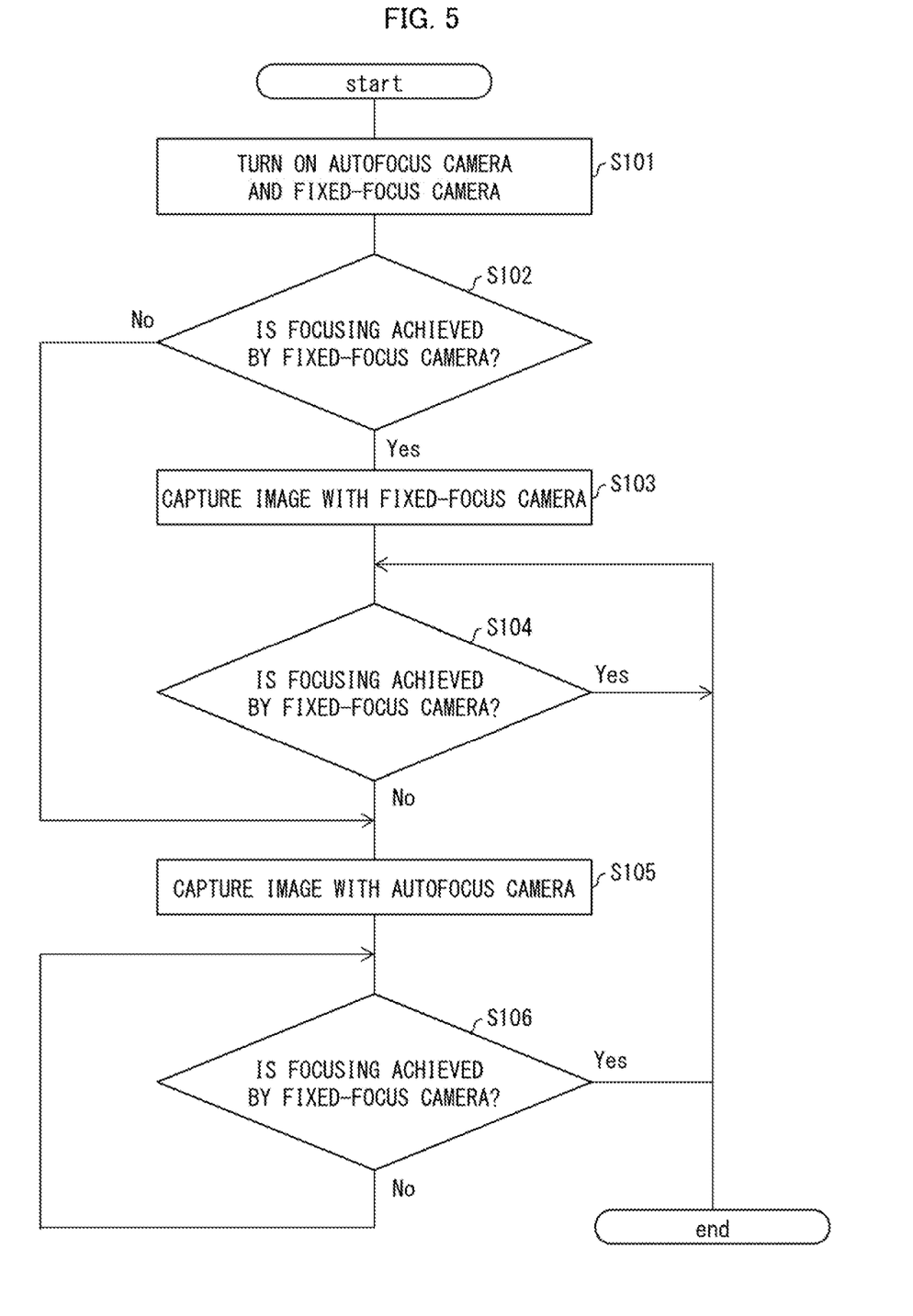
FIG. 5 is a flowchart of an operation example 1 of the electronic device.

A flow of an operation of the electronic device 10 will be described next with reference to a flowchart illustrated in FIG. 5. In Step S101 (hereinafter the term "Step" will be omitted), the control device 3 turns on both of the autofocus camera 1 and the fixed-focus camera 2. The process proceeds to S102.

In S102, the distance identifying section 31 identifies an image capturing distance between a subject and the electronic device 10 (distance identifying step). Then, the control device 3 determines whether or not focusing is achieved by the fixed-focus camera 2 according to the image capturing distance identified by the distance identifying section 31. In a case where it is determined that the focusing is achieved by the fixed-focus camera 2 (Yes), the process proceeds to S103. In a case where it is determined that the focusing is not achieved by the fixed-focus camera 2 (No), the process proceeds to S105.

In S103, (i) the image capturing device determining section 32 decides that image capturing is to be performed with use of the fixed-focus camera 2 (image capturing device determining step), (ii) the selecting device 6 selects the fixed-focus camera 2 as a device to perform the image capturing, and (iii) the image capturing is performed with use of the fixed-focus camera 2. Then, the process proceeds to S104.

In S104, the distance identifying section 31 identifies an image capturing distance between a subject and the electronic device 10 (distance identifying step). Then, the control device 3 determines whether or not focusing is achieved by the fixed-focus camera 2 according to the image capturing distance identified by the distance identifying section 31. In a case where it is determined that the focusing is achieved by the fixed-focus camera 2 (Yes), the process returns to S104. In a case where it is determined that the focusing is not achieved by the fixed-focus camera 2 (No), the process proceeds to S105.

In S105, (i) the image capturing device determining section 32 decides that image capturing is to be performed with use of the autofocus camera 1 (image capturing device determining step), (ii) the selecting device 6 selects the autofocus camera 1 as a device to perform the image capturing, and (iii) the image capturing is performed with use of the autofocus camera 1. Then, the process proceeds to S106.

In S106, the distance identifying section 31 identifies an image capturing distance between a subject and the electronic device 10 (distance identifying step). Then, the control device 3 determines whether or not focusing is achieved by the fixed-focus camera 2 according to the image capturing distance identified by the distance identifying section 31. In a case where it is determined that the focusing is achieved by the fixed-focus camera 2 (Yes), the process returns to S104. In a case where it is determined that the focusing is not achieved by the fixed-focus camera 2 (No), the process returns to S106.

Note that it is possible to choose to end the image capturing at any point in the flowchart. In the flow, in a case where the autofocus camera 1 and the fixed-focus camera 2 are turned on simultaneously, the autofocus camera 1 and the fixed-focus camera 2 can each respond quickly to switching between the cameras.

<<Operation Example 2 of Electronic Device>>

Figure 6:
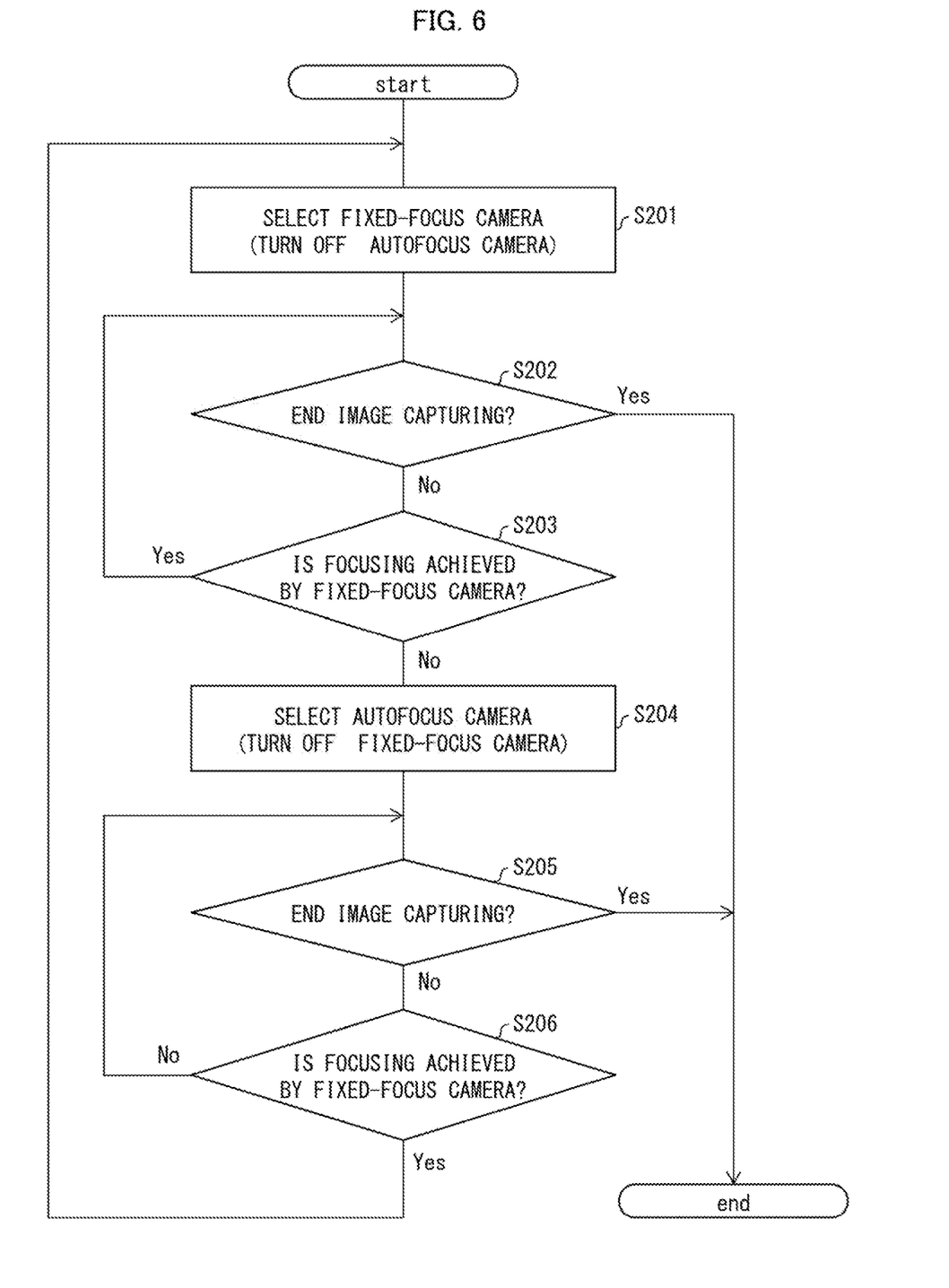
FIG. 6 is a flowchart of an operation example 2 of the electronic device.

A flow of another operation of the electronic device 10 will be described next with reference to a flowchart illustrated in FIG. 6. In the present operation example, unlike the flow of the operation example 1 described above, electric power consumption is reduced by turning off a power supply of a camera which is not used. Note, however, that in view of an amount of time it takes to turn on the power supply of the camera, it is necessary to perform a control to turn on a power supply of the other camera before switching between the cameras (see S203 and S206 described later). In addition, in the present operation example, whether or not focusing is achieved by the fixed-focus camera 2 is checked with use of a camera being used for image capturing (or with use of the distance sensor 4 or the like apart from the camera).

In a case where switching is to be performed from the fixed-focus camera 2 to the autofocus camera 1, a focus of the autofocus camera 1 is adjusted in advance so that a subject within an image capturing distance at the time can be in focus. This allows image capturing while a subject is in focus to be performed as soon as the switching between the cameras is performed.

In S201, (i) the image capturing device determining section 32 selects the fixed-focus camera 2 via the selecting device 6 and (ii) the control device 3 turns off the power supply of the autofocus camera 1. Then, the process proceeds to S202. In S202, the control device 3 checks whether or not the image capturing by the fixed-focus camera 2 has been completed. In a case where the image capturing has been completed, the operation ends. In a case where the image capturing has not been completed, the process proceeds to S203.

In S203, the distance identifying section 31 identifies an image capturing distance between a subject and the electronic device 10 (distance identifying step). Then, the control device 3 determines whether or not focusing is achieved by the fixed-focus camera 2 according to the image capturing distance identified by the distance identifying section 31. In a case where it is determined that the focusing is achieved by the fixed-focus camera 2 (Yes), the process returns to S202. In a case where it is determined that the focusing is not achieved by the fixed-focus camera 2 (No), the process proceeds to S204.

In S204, (i) the image capturing device determining section 32 selects the autofocus camera 1 via the selecting device 6 (image capturing device determining step) and (ii) the control device 3 turns off the power supply of the fixed-focus camera 2. Then, the process proceeds to S205. In S205, the control device 3 checks whether or not the image capturing by the autofocus camera 1 has been completed. In a case where the image capturing has been completed, the operation ends. In a case where the image capturing has not been completed, the process proceeds to S206.

In S206, the distance identifying section 31 identifies an image capturing distance between a subject and the electronic device 10 (distance identifying step). Then, the control device 3 determines whether or not focusing is achieved by the fixed-focus camera 2 according to the image capturing distance identified by the distance identifying section 31. In a case where it is determined that the focusing is achieved by the fixed-focus camera 2 (Yes), the process returns to S201. In a case where it is determined that the focusing is not achieved by the fixed-focus camera 2 (No), the process returns to S205.

[Software Implementation Example]

Control blocks of the control device 3 of the electronic device 10 (particularly, the distance identifying section 31 and the image capturing device determining section 32) can be realized by a logic circuit (hardware) provided in an integrated circuit (IC chip) or the like or can be alternatively realized by software.

In the latter case, the control device 3 includes a computer that executes instructions of a program that is software realizing the foregoing functions. The computer, for example, includes at least one processor (control device) and at least one computer-readable storage medium in which the program is stored. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

[Recap]

An electronic device (10) in accordance with Aspect 1 of the present invention includes: at least one first image capturing device (autofocus camera 1) having an auto-focus function; at least one second image capturing device (fixed-focus camera 2) having a fixed focal point; and at least one control device (3), the at least one control device being configured to perform (a) a process of identifying an image capturing distance between a subject and the electronic device and (b) a process of determining, according to the image capturing distance identified, which one of the at least one first image capturing device and the at least one second image capturing device is to be used for image capturing.

According to the above configuration, the at least one second image capturing device is an image capturing device having a fixed focal point so that the lens of the at least one second image capturing device is completely fixed. Therefore, in a case where image capturing is performed with use of the at least one second image capturing device, stable image capturing can be performed without an effect of a movement of the lens.

Note that since the at least one second image capturing device has the fixed focal point, a range in which a subject can be in focus is limited. Therefore, the subject may become out of focus so as to result in blurring outside the range. According to the configuration, however, which device of the at least one first image capturing device and the at least one second image capturing device is to be used for image capturing is determined according to an image capturing distance. Therefore, in a case where there is a possibility that blurring can occur as a result of image capturing with use of the at least one second image capturing device, blurring can be prevented by switching the image capturing device to the at least one first image capturing device having the auto-focus function. This makes it possible to perform stable image capturing and to prevent blurring.

An electronic device in accordance with Aspect 2 of the present invention can be configured in Aspect 1 so that the at least one control device is configured to identify, in a case where a path of light entering an image capturing element from a lens of the at least one second image capturing device is pupil-divided into a first path and a second path, the image capturing distance by use of an amount by which the following positions of the image capturing element are shifted from each other: (i) a position onto which the subject is imaged by light in the first path and (ii) a position onto which the subject is imaged by light in the second path. With the configuration, an image capturing distance can be identified by use of an amount by which the following positions of the image capturing element are shifted from each other: (i) a position onto which the subject is imaged by light in the first path and (ii) a position onto which the subject is imaged by light in the second path.

An electronic device in accordance with Aspect 3 of the present invention can be configured in Aspect 1 so as to further include: at least one distance measuring sensor, the at least one control device being configured to identify the image capturing distance by use of a result of detection performed by the at least one distance measuring sensor. With the configuration, the image capturing distance can be identified by use of the result of the detection performed by the at least one distance measuring sensor.

An electronic device in accordance with Aspect 4 of the present invention can be configured in Aspect 1 so that the at least one control device is configured to identify the image capturing distance by use of information on a position of a lens of the at least one first image capturing device when the at least one first image capturing device have a focus on the subject. With the configuration, the image capturing distance can be identified by use of the information on the position of the lens of the at least one first image capturing device when the at least one first image capturing device has a focus on the subject.

An electronic device in accordance with Aspect 5 of the present invention is preferably configured in any one of Aspects 1 through 4 so that a distance between the at least one second image capturing device and a point of focus of the at least one second image capturing device is a hyperfocal length. With the configuration, it is possible to maximize a range in which it is possible to prevent blurring which occurs when image capturing is performed with use of the at least one second image capturing device.

A control device (3) in accordance with Aspect 6 of the present invention is a control device configured to control an electronic device (10), the electronic device including: at least one first image capturing device (autofocus camera 1) having an auto-focus function; and at least one second image capturing device (fixed-focus camera 2) having a fixed focal point, the control device including: a distance identifying section (31) configured to identify an image capturing distance between a subject and the electronic device; and an image capturing device determining section (32) configured to determine, according to the image capturing distance identified, which one of the at least one first image capturing device and the at least one second image capturing device is to be used for image capturing. With the configuration, it is possible to obtain an effect similar to that obtained by Aspect 1. A control method in accordance with Aspect 7 of the present invention is a method of controlling an electronic device, the electronic device including: at least one first image capturing device having an auto-focus function; and at least one second image capturing device having a fixed focal point, the method including the steps of: (a) identifying an image capturing distance between a subject and the electronic device; and (b) determining, according to the image capturing distance identified, which one of the at least one first image capturing device and the at least one second image capturing device is to be used for image capturing. With the method, it is possible to obtain an effect similar to that obtained by Aspect 1.

The control device according to the foregoing aspects of the present invention can be realized by a computer. In such a case, the following can be encompassed in the scope of the present invention: a control program for the control device which program causes a computer to operate as each section (software element) of the control device so that the control device can be realized by the computer; and a computer-readable storage medium in which the control program is stored.

Additional Remarks

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Autofocus camera (first image capturing device)
2 Fixed-focus camera (second image capturing device)
3 Control device
4 Distance sensor (distance measuring sensor)
5 Motor driver
6 Selecting device
7 Out-of-focus detecting device
8 Image processing device
9 Storage device
10 Electronic device
11 Display device
12 Input receiving device

The invention claimed is:
1. An electronic device comprising:
at least one first image capturing device having an auto-focus function;
at least one second image capturing device having a fixed focal point; and
at least one control device, the at least one control device being configured to perform
(a) a process of identifying an image capturing distance between a subject and the electronic device and
(b) a process of determining, according to the image capturing distance identified, which one of the at least one first image capturing device and the at least one second image capturing device is to be used for image capturing, the at least one control device being configured to
identify, in a case where a path of light entering an image capturing element from a lens of the at least one second image capturing device is pupil-divided into a first path and a second path, the image capturing distance by use of an amount by which the following positions of the image capturing element are shifted from each other: (i) a position onto which the subject is imaged by light in the first path and (ii) a position onto which the subject is imaged by light in the second path.

2. The electronic device according to claim 1, further comprising:
at least one distance measuring sensor,
the at least one control device being configured to identify the image capturing distance by use of a result of detection performed by the at least one distance measuring sensor.

3. The electronic device according to claim 1, wherein
the at least one control device is configured to identify the image capturing distance by use of information on a position of a lens of the at least one first image capturing device when the at least one first image capturing device have a focus on the subject.

4. The electronic device according to claim 1, wherein
a distance between the at least one second image capturing device and a point of focus of the at least one second image capturing device is a hyperfocal length.

5. A control device configured to control an electronic device,
said electronic device comprising:
at least one first image capturing device having an auto-focus function;
at least one second image capturing device having a fixed focal point;
at least one processor; and
at least one storage medium readable by the processor,
the processor being configured to perform:
a process of identifying an image capturing distance between a subject and the electronic device; and
a process of determining, according to the image capturing distance identified, which one of the at least one first image capturing device and the at least one second image capturing device is to be used for image capturing, in the process of identifying the image capturing distance, in a case where a path of light entering an image capturing element from a lens of the at least one second image capturing device is pupil-divided into a first path and a second path, the image capturing distance by use of an amount by which the following positions of the image capturing element are shifted from each other: (i) a position onto which the subject is imaged by light in the first path and (ii) a position onto which the subject is imaged by light in the second path.

6. A storage medium in which a control program for causing a computer to serve as the control device according to claim 5 is stored, the control program causing the computer to perform the process of identifying the image capturing distance and the process of determining, according to the image capturing distance identified, which one of the at least one first image capturing device and the at least one second image capturing device is to be used for image capturing.

7. A method of controlling an electronic device,
said electronic device comprising:
at least one first image capturing device having an auto-focus function; and
at least one second image capturing device having a fixed focal point,
said method comprising the steps of:
(a) identifying an image capturing distance between a subject and the electronic device; and
(b) determining, according to the image capturing distance identified, which one of the at least one first image capturing device and the at least one second image capturing device is to be used for image capturing, in the process of identifying the image capturing distance, in a case where a path of light entering an image capturing element from a lens of the at least one second image capturing device is pupil-divided into a first path and a second path, the image capturing distance by use of an amount by which the following positions of the image capturing element are shifted from each other: (i) a position onto which the subject is imaged by light in the first path and (ii) a position onto which the subject is imaged by light in the second path.

* * * * *